United States Patent [19]
Johnson

[11] 3,928,478
[45] Dec. 23, 1975

[54] CHLORINATION OF XYLENE
[75] Inventor: Thomas Albert Johnson, Newark, Del.
[73] Assignee: E. I. Du Pont de Nemours & Company, Wilmington, Del.
[22] Filed: Jan. 17, 1974
[21] Appl. No.: 434,021

[52] U.S. Cl. .......................... 260/651 R; 210/651 R
[51] Int. Cl.² .................. C07C 25/14; C07C 25/125
[58] Field of Search .................... 260/651 R, 650 R

[56] References Cited
UNITED STATES PATENTS

| | | | |
|---|---|---|---|
| 2,608,592 | 8/1952 | Lawlor et al. | 260/651 R |
| 2,814,649 | 11/1957 | Pritchard | 260/651 R |
| 3,068,298 | 12/1962 | Huffman | 260/651 R |

*Primary Examiner*—D. Horwitz

[57] ABSTRACT

Process for chlorinating p-xylene in perchloroethylene to produce $\alpha,\alpha',2,3,5,6$-hexachloro-p-xylene.

4 Claims, No Drawings

CHLORINATION OF XYLENE

BACKGROUND OF THE INVENTION

Chlorinated p-xylenes have been used in the synthesis of glycols and esters as well as pesticidal applications. The chlorination process often involves the use of carbon tetrachloride or trichlorobenzene as a reaction medium, $\alpha,\alpha',2,3,5,6$-Hexachloro-p-xylene has previously been prepared by first preparing and isolating tetrachloroxylene followed by a separate chlorination of the methyl groups in the presence of light. While this process provided a satisfactory chlorinated product, the required isolation of an intermediate compound is somewhat inefficient for commercial operations. The filtration and recharging to another reactor is inconvenient and time-consuming. In addition, the low solubility of the final product in carbon tetrachloride requires a large reactor system for a small charge. A more efficient method of production would, therefore, be desirable.

SUMMARY OF THE INVENTION

The process of the present invention permits the preparation of $\alpha,\alpha',2,3,5,6$-hexachloro-p-xylene without isolation of an intermediate compound and permits the use of smaller reaction vessels per unit of product than have heretofore been possible.

Specifically, the instant invention provides a process for preparing $\alpha,\alpha',2,3,5,6$-hexachloro-p-xylene by admixing p-xylene or its ring-chlorinated derivatives and perchloroethylene; incrementally adding thereto about from 7 to 10 moles of chlorine gas at a temperature of about from 60° to 120°C. in the presence of at least about 1%, by weight of the p-xylene, of Lewis acid catalyst over a period of about from 10 to 20 hours; separating the catalyst from the reaction mass and isolating the product.

DETAILED DESCRIPTION OF THE INVENTION

The starting materials that can be used in the present process include p-xylene as well as ring-chlorinated derivatives thereof substituted with from 1 to 4 chlorine atoms. As will be readily apparent, however, the economic advantages of the present process are most fully realized with unsubstituted p-xylene.

The starting materials are treated with chlorine in the presence of a Lewis acid catalyst in a reaction medium consisting essentially of perchloroethylene. The chlorination products of p-xylene are much more soluble in perchloroethylene than in the carbon tetrachloride previously used. This is surprising, in view of the close similarity of the two solvents. The quantity of perchloroethylene used should be at least sufficient to form a slurry amenable to efficient mixing by conventional agitators. Formation of a solution of the entire quantity of reactant is unnecessary, and would require excessive amounts of perchloroethylene. About from 1.5 to 2.5 moles of the solvent per mole of p-xylene provide a stirrable mass throughout the course of the reaction, and these proportions are preferred in the present process. As reaction progresses, the four ring positions are chlorinated first, then chlorine atoms replace one hydrogen on each of the substituent methyl groups. The reaction can be carried to at least 90% yield of the desired product, $\alpha,\alpha',2,3,5,6$-hexachloro-p-xylene without isolation of the ring chlorinated intermediate.

Representative Lewis acid catalysts which can be used include ferric chloride, aluminum chloride, zinc chloride, antimony pentachloride, and boron trifluoride, and the like. It has been found that as little as 1% by weight of the p-xylene of catalyst will carry the chlorination reaction completely to the hexachloro product, without exposure of the reaction mass to actinic light. This is surprising since earlier processes recommend that the side chain chlorination be carried out in the presence of light.

At least six moles of chlorine per mole of xylene are required, and normally a molar excess of 10 to 25% will be used. The amount of chlorine consumed will vary according to mixing efficiency.

The temperature of the reaction mixture, which rises due to heat of reaction, should be maintained at about from 60° to 120°C. during chlorination. Under these conditions there is a minimum amount of reaction between chlorine and perchloroethylene. This can be conveniently controlled by regulating the chlorine addition rate. Chlorine addition is best carried out at 75°–85°C. during the first part of the chlorination until ring chlorination is substantially complete. Higher temperatures during this period may promote undesirable side reactions between molecules of partially chlorinated xylene. The temperature can be raised to about 100°–120°C. during the later stages of the process, when the side chains are being chlorinated.

Progress of the chlorination can be followed by gas chromatographic analyses to determine the relative amount of hexachloro and pentachloroxylene. It is preferred that the chlorination be carried to only about 90% completion, that is, 90% of the xylene starting material is converted to the hexachloro product while the remainder has less than six chlorine substituents.

The reaction conditions of the present process also permit the chlorination of the perchloroethylene solvent, particularly after all of the xylene has been converted to at least pentachloroxylene. Hexachloroethane formation is promoted by a larger excess of chlorine in the reaction mixture. Accordingly, isolation of the product at the completion of about 90% conversion of hexachloroxylene combined with less rapid addition of chlorine toward the end of the reaction depresses the undesired side reaction.

When the chlorination has progressed to the desired point, the product is placed in solution to permit removal of the solid catalyst by filtration. To facilitate complete solution of the product, the temperature of the mass is raised to about the boiling point of the solvent to obtain maximum solubility, and more perchloroethylene is added as needed to insure solution of all the organic product. A small amount of carbon may be added before the filtration to remove small amounts of colored impurities.

After filtering to remove the catalyst, the ratio of solvent to solid product should be about 1.1 to 1.0. The solution can then be cooled to about 5°C. and the hexachloroxylene isolated by filtration, washed with cold perchloroethylene and dried. Drying can be done by any convenient means, including air drying or oven drying. The product has a purity of greater than 99% $\alpha,\alpha'2,3,5,6$-hexachloro-p-xylene.

In a preferred method of carrying out the process of the invention at least about 2½ parts of perchloroethylene are mixed with 1 part of p-xylene and about 0.01 part of $FeCl_3$ Lewis acid catalyst. Chlorine gas is added with vigorous agitation at the rate of about 0.5–0.6 part per hour. If the mixture becomes two viscous up to about 1.0 part of additional perchloroethylene can be added. Toward the end of the chlorination, the chlorine addition rate can be reduced to one half of the original rate, and finally to one-quarter of the original rate. The mass is significantly thinner and easier to stir at higher temperatures of the range indicated above.

The present invention provides a process for the efficient preparation of hexachloro-p-xylene, which is an intermediate for the preparation of polymers useful in textile fiber applications. The process is a continuous procedure, not requiring separation of an intermediate chlorinated product. In addition, the process can operate at excellent efficiency without the additional catalytic effect of light in the final chlorination steps. The use of perchloroethylene, in addition to permitting the synthesis of the hexachloro compound without isolation of an intermediate, exhibits significant economic advantages over the carbon tetrachloride previously used. The significantly greater solubility of the perchloroethylene permits the use of only about 1/5th as much solvent by weight, thus reducing the size of the reaction vessel required. In addition, the present process requires substantially less catalyst than had previously been required, about 3% catalyst being required for comparable reaction rates when carbon tetrachloride is used.

The invention is further illustrated by the following specific examples, in which parts are by weight unless otherwise is indicated.

EXAMPLE

A flask was fitted with an agitator and means for adding a gas below the surface of the liquid contents. The flask was charged with 245 parts of dry perchloroethylene, 102 parts (0.962 mole) of p-xylene and 1.0 part of anhydrous ferric chloride. The mixture was agitated vigorously and chlorine gas added through the gas inlet at a rate of 0.58 part per hour. The temperature in the reaction mass rose spontaneously to about 80°C. After about 5 hours, a solid crust was observed forming at the top of the mass, and an additional 82 parts of perchloroethylene were added to thin the mass. At this point the temperature was raised to about 100°C., and after another hour the chlorine addition rate was lowered to 0.28 part per hour. After another 3.4 hours, the rate was lowered to 0.14 part per hour and maintained at that rate for another 4 hours when vapor phase chromatographic analysis of a sample indicated 90% conversion of pentachloroxylene to hexachloroxylene. During the last half hour, the temperature was raised to 110°C. to keep the mass thin. The chlorine addition was stopped after a total chlorination time of 13.4 hours, and another 325 parts of perchloroethylene and 5 parts of activated carbon were added. The additional solvent assured that the chlorinated product would remain in solution during filtration. Then, with temperature raised to 120°C., the reaction mixture was pressure filtered through a medium porosity glass fritted funnel to remove the solid catalyst. The residue on the filter was washed with 82 parts of hot perchloroethylene, the wash being added to the filtrate. Distillation removed 407 parts of perchloroethylene (the amount added after chlorine addition was stopped). The remaining clarified solution was cooled to 5°C. and the precipitated solids were removed by filtration, a little more cold perchloroethylene being employed to aid in transferring the stiff mass to the filter. The product was washed with two 205 part portions of perchloroethylene at 5°C., then dried by passing air through it at room temperature until all the solvent had been removed. There were obtained 260.4 parts (0.834 mole) of product of 99.8% purity as analyzed by vapor phase chromatography. During the chlorination, the charge contained about 3.2 parts of perchloroethylene per part of xylene starting material. The yield was about 87% of isolated product.

COMPARATIVE EXAMPLE

The above procedure was repeated, except that carbon tetrachloride was used as the reaction mixture instead of perchloroethylene. To attain satisfactory viscosity of the reaction mass, 17.6 parts of carbontetrachloride were required per part of xylene. By contrast, 3.2 parts of perchloroethylene per part of xylene were used in the previous example during chlorination, and no more than 7 parts of perchloroethylene were used at any point in the process per part of starting material or product. Approximately the same yield of the desired product was attained after 20 hours of chlorination.

I claim:

1. In a process for preparing $\alpha$, $\alpha'$, 2, 3, 5, 6-hexachloro-p-xylene by admixing p-xylene or its ring-chlorinated derivatives and a solvent; incrementally adding thereto about from 7 to 10 moles of chlorine gas at a temperature of about from 60° to 120°C. in the presence of at least about 1%, by weight of the p-exylene, of Lewis acid catalyst, over a period of about from 10 to 20 hours; separating the catalyst from the reaction mass and isolating the product, the improvement wherein the solvent consists essentially of perchloroethylene.

2. A process of claim 1 in which about from 1.5 to 2.5 moles of perchloroethylene are present in the reaction mass per mole of p-xylene.

3. A process of claim 1 wherein the temperature of the reaction mass is maintained at about from 75° to 85°C. until ring chlorination of the p-xylene is substantially complete; subsequently maintaining the temperature at about from 100° to 120°C. until at least about 90% of the p-xylene is converted to $\alpha,\alpha'$,2,3,5,6-hexachloro-p-xylene, and thereupon terminating addition of chlorine gas.

4. A process of claim 1 wherein the Lewis acid catalyst consists essentially of ferric chloride.

* * * * *